United States Patent [19]

Souder

[11] 4,369,429

[45] Jan. 18, 1983

[54] TRAFFIC SIGNAL HOUSING ADAPTER

[75] Inventor: Alan M. Souder, Jacksonville, Fla.

[73] Assignee: Trafcon, Inc., Jacksonville, Fla.

[21] Appl. No.: 246,230

[22] Filed: Mar. 23, 1981

[51] Int. Cl.³ .......... E01F 9/00; H02G 3/08

[52] U.S. Cl. .......... 340/119; 220/3.9

[58] Field of Search .......... 174/50, 17 CT; 340/119, 340/84; 220/4, 3.92, 3.9, 3.94; 312/223; 339/119 R, 122 R, 122 F; 362/382, 457

[56] References Cited

U.S. PATENT DOCUMENTS

| | | | |
|---|---|---|---|
| 2,925,458 | 2/1960 | Lester | 362/382 |
| 2,970,289 | 1/1961 | Loomis | 174/50 |
| 3,706,070 | 12/1972 | Eikenberry | 340/119 |
| 3,991,400 | 11/1976 | Buehler | 340/119 |
| 4,117,456 | 9/1978 | Albrecht | 340/119 |
| 4,142,173 | 2/1979 | Gould et al. | 340/119 |

*Primary Examiner*—Donald J. Yusko
*Attorney, Agent, or Firm*—Arthur G. Yeager

[57] ABSTRACT

An adapter member for connection to the top or bottom surface of a molded plastic traffic signal housing and adapted to be connected to the outlet of a wire entrance fixture, said adapter member comprising a rigid body having a top, a bottom, and a passageway through the body from the top to the bottom, said body adjacent the passageway at the top being shaped to mate with the outlet end of the wire entrance fixture so as to provide 360° rotational positioning of the body with respect to the fixture, said bottom of said body being shaped and adapted to be fastened to extend over the major portion of said top or bottom surface of said molded plastic traffic signal housing.

16 Claims, 10 Drawing Figures

TRAFFIC SIGNAL HOUSING ADAPTER

BACKGROUND OF THE INVENTION

This invention relates to an improved structure for traffic signals that may be suspended over highways or rigidly attached to posts alongside highways.

Traffic signals with the familiar, red, green, and yellow lights for controlling automobile and pedestrain traffic are frequently enclosed in a plastic housing which may be suspended over the roadway from an arm or one or more cables, or attached to a post alongside the roadway. The normal component parts of these signals include a generally rectangular housing in which the lighting fixtures and wiring are contained and protected from the weather, or a rigid wire entrance fixture which is a specially designed metallic pipe elbow though which power lines enter the housing and from which the entire combination may be suspended from an overhead structure or from cables or otherwise supported by posts. The experience of using this combination has been satisfactory except for a tendency for the plastic housing to fail around the connection between the rigid wire entrance fixture and the more flexible housing. A study of the failures has led to the conclusion that the cyclic bending and twisting of the signal housing due to gusts of wind and other atmospheric conditions caused fatigue failure of the plastic around the rigid connection to the wire entrance fixture.

It is an object of this invention to provide an adapter to be employed between the wire entrance fixture and the traffic signal housing to eliminate, to the maximum extent possible, fatigue failure of the type experienced in the past.

BRIEF SUMMARY OF THE INVENTION

This invention provides an adapter member for connection to the top or bottom surface of a molded plastic traffic signal housing and adapted to be connected to the outlet of a wire entrance fixture said adapter comprising a rigid body having a top, a bottom, and a passageway through said body from said top to said bottom; said body adjacent said passageway at said top being shaped to mate with the outlet end of said wire entrance fixture so as to provide 360° rotational positioning of said body with respect to said fixture; said bottom of said body being shaped and being adapted to be fastened to and to extend over the major portion of said top or bottom surface of said molded plastic traffic signal housing. In one preferred embodiment of this invention the adapter member has a continuous upper surface and an internal honeycomb structure. In another preferred embodiment of this invention the adapter member adjacent the top end of the passageway through the adapter member includes a circular shoulder serrated to mate with a similar serrated shoulder on the outlet of said wire entrance fixture. In still another preferred embodiment of this invention a bolt fastening means is employed to join the housing, the adapter, and the wire entrance fixture such that the fixture can be rotated 360° with respect to the adapter member and the housing.

BRIEF DESCRIPTION OF THE DRAWINGS

The novel features believed to be characteristic of this invention are set forth with particularity in the appended claims. The invention itself, however both as to its organization and method of operation, together with further objects and advantages thereof, may best be understood by reference to the following description taken in connection with the accompanying drawings in which:

DETAILED DESCRIPTION OF THE INVENTION

The adapter member of this invention serves as a strengthening element between the molded plastic traffic signal housing and the wire entrance fixture regardless of whether the traffic signal is suspended from above or is supported from below. When the housing is suspended from above, the adapter member is fastened to the top surface of the housing and a wire entrance suspension fixture attached to the adapter member. When the housing is supported from below, the adapter member is fastened to the bottom surface of the housing and a wire entrance fixture attached to the adapter member. It may be desirable to support the housing from both the top and the bottom, in which event two adapter members are employed, one fastened to the top surface of the housing and the other to the bottom surface of the housing with wire entrance fixtures attached to either or to both adapter members.

The adapter member is rigid, preferably being made of a light weight cast metal such as aluminum. It is designed to be substantially coextensive with the surface of the housing to which the adapter member is attached. Such a design strengthens the entire assembly and allows the adapter member to asorb the stresses which, in the absence of the adapter member, would be received by the plastic housing and eventually result in failure of the housing. The adapter member is designed to be connected to all standard types of mounting hardware, e.g. disconnect hangers, post supports, drop pipes, arm supports, etc.

Figure 1:
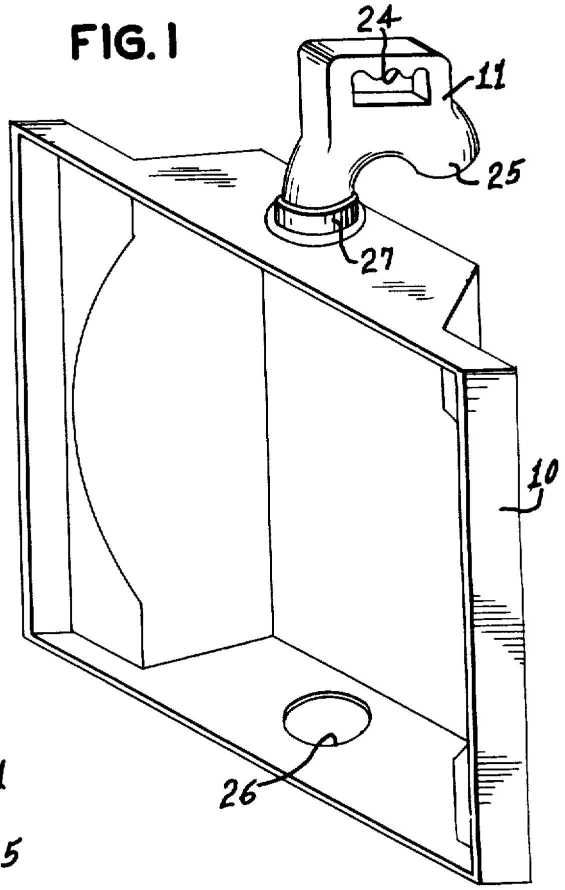
FIG. 1 is a perspective view of a traffic signal assembly of the prior art.

A general arrangement of the component parts of a prior art traffic signal assembly is shown in FIG. 1.

Traffic signal housing 10 is essentially a rectangular container having an open front into which a panel of signal lights and their associated wiring and controls could be fitted and fastened into place. Housing 10 has entrance ports 26 through both its top and bottom surfaces to permit wiring to be connected to the signal panel and to an outside source of electric power. In this drawing port 26 is shown in the bottom surface of housing 10 while the corresponding port in the top surface of housing 10 cannot be seen because it is hidden by reason of the attachment of fixture 11 through that port. Wire entrance fixture 11 is a specially designed pipe elbow, normally made of a cast metal, such as aluminum. Fixture 11 is a hollow tubular element having inlet end 25 through which lead wiring is admitted to be connected to the signal lights and controls fastened into housing 10. Outlet end 27 of fixture 11 can take on any of several shapes and fittings suitable for rigid connection to housing 10 at any desired radial orientation between fixture 11 and housing 10. Normally, port 26 is molded with an annular serrated shoulder which mates with a similar annular serrated portion on fixture 11, so that fixture 11 may be turned 360° to any direction with respect to housing 10 and fastened into place as the selected position. Methods and means of fastening fixture 11 to housing 10 include, bolts, screws, pipe thread connections, pipe thread nuts, etc. The preferred connecting means will be described in more detail in the following explanation of this invention. The signal assembly is supported in any convenient fashion overhead or alongside the highway to control vehicular and pedestrain traffic. Fixture 11 is normally manufactured with a suspension portion 24 which serves as a hanger for attachment to one or more overhead cables or support arms when the assembly is placed over the highway. In such an arrangement housing 10 may be supported solely through port 26 in its top surface. For a more stable arrangement housing 10 may be supported from both the top and the bottom by the attachment of suitable fixtures to both the upper and lower ports 26. In signals attached to posts alongside the highway it is also common to support housing 10 solely by attaching a fixture to the lower port 26 and bringing the lead wiring into housing 10 through that bottom support fixture.

The signal assembly of the prior art as described above proved to be deficient in that after an unpredictable period of use housing 10 would fail near its attachment to fixture 11. As has been mentioned previously this failure of housing 10 was due to the twisting and flexing of housing 10 caused by gusts of wind which eventually caused fatigue failure of the plastic housing 10.

Figure 2:
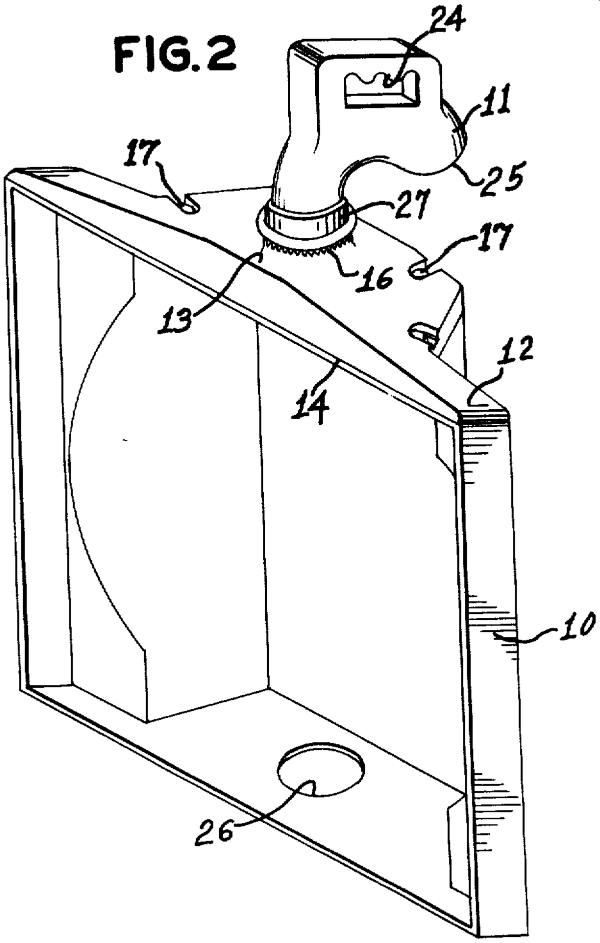
FIG. 2 is a perspective view of the combination of a traffic signal assembly of this invention.

In FIG. 2, there is shown the signal assembly of this invention which has solved the problem of fatigue failure. Adapter member 12 is inserted between fixture 11 and housing 10 to produce a stronger, stress-absorbing assembly. Adapter member 12 is a rigid structure, preferably made of the same cast metal as that of fixture 11, i.e. aluminum. Adapter member 12 has a planar bottom surface 14 which substantially corresponds to the top and bottom surfaces of housing 10, and has a construction at the top which will mate with outlet 27 of fixture 11 in the same manner as port 26 of housing 10. A passageway extends through adapter member 12 from the top to the bottom to form a connecting conduit between outlet 27 and port 26 in housing 10 to permit lead wires to extend from inside housing 10 to outside the signal assembly. The general outside shape of adapter member 12 is that which forms a smooth transition between tubular outlet 27 and the planar angular top or bottom surface of housing 10.

Figure 3:
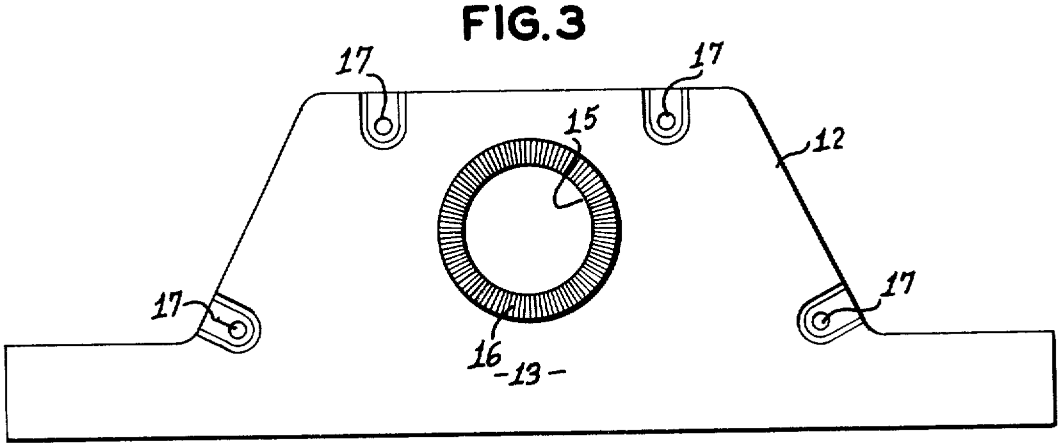
FIG. 3 is a top plan view of the adapter member of this invention.
Figure 5:
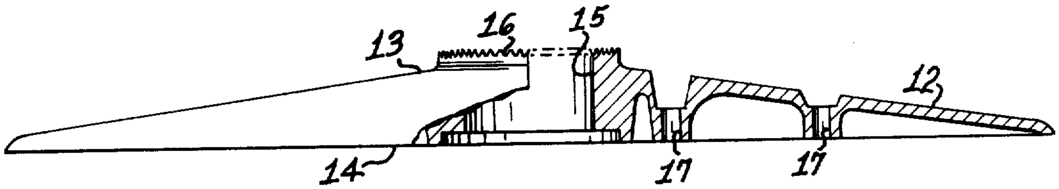
FIG. 5 is a cross sectional view taken at 5—5 shown in FIG. 4.
Figure 4:
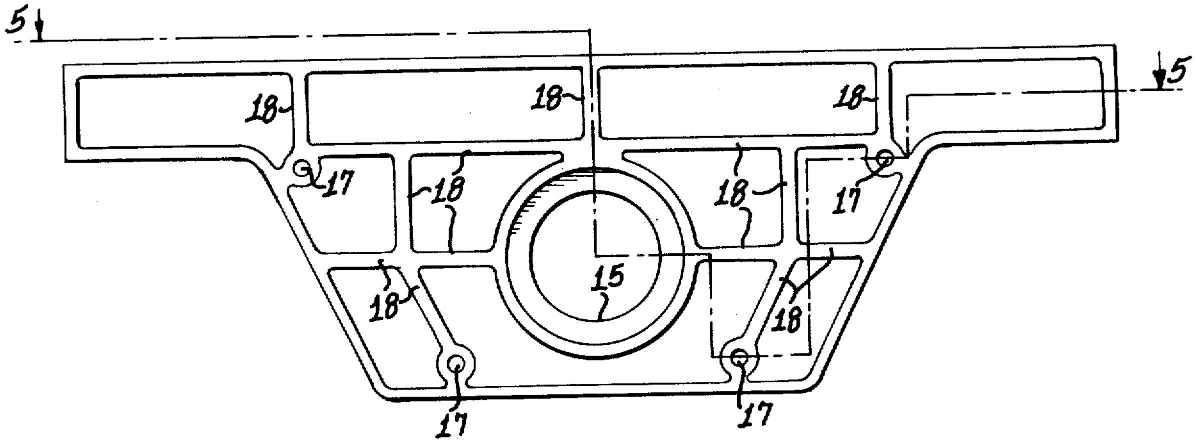
FIG. 4 is a bottom plan view of the adapter member of this invention.

The general structure of the adapter member of this invention can best be seen in FIGS. 3, 4, and 5. In FIG. 3 adapter member 12 is shown to have a continuous top surface 13 with a vertical passageway 15 extending completely through the adapter member. Bolt holes 17 are provided in sufficient number and at an appropriate spacing which will permit adapter member 12 to be fastened solidly to the top or bottom surface of housing 10 and to extend over the major portion of the top or bottom surface of housing 10. Holes 17 may be smooth for use with corresponding bolts, and nuts, or they may be tapped for use with corresponding screws. Preferably the outline as seen in FIG. 3 will be substantially identical to the top view and to the bottom view of housing 10.

In the embodiment shown in FIGS. 4 and 5 the body of adapter member 12 adjacent the top of passageway 15 is fashioned with a shoulder having a circular serrated surface 16 to match the serrated surface on the outlet 27 of wire entrance fixture 11. A suitable type of serration which is standard in traffic signal equipment, has 72 teeth equally spaced over the entire circumference of passageway 15 to provide 72 possible rotational positions (5° increments) between adapter member 12 and fixture 11. This variety in optional positioning has been found to be necessary to provide the traffic engineer with the needed positional adjustments in orienting the traffic signal for any possible intersection of highways and for any means of suspension or support.

In FIG. 4 the internal structure of adapter member 12 may be seen in its preferred design with a honeycomb arrangement of a series of dished out portions and reinforcing webs 18. This provides the optimum in strength with the least weight of material. Adapter member 12 may be made of any rigid light weight material, preferably cast aluminum.

In FIG. 5 the cross sectional view emphasizes the hollow, webbed, honeycomb structure and also shows the tapering top surface 13 to provide a smooth juncture between the angular surface of housing 10 and the tubular shape of fixture 11 which is pleasing in appearance.

Figure 7:
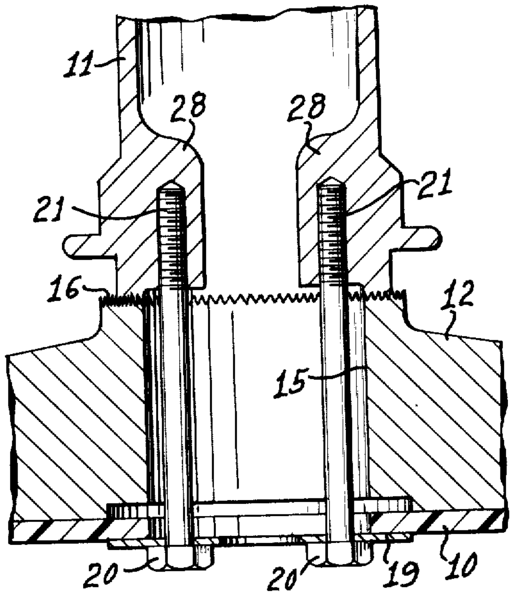
FIG. 7 is a cross sectional view taken at 7—7 of FIG. 6.
Figure 6:
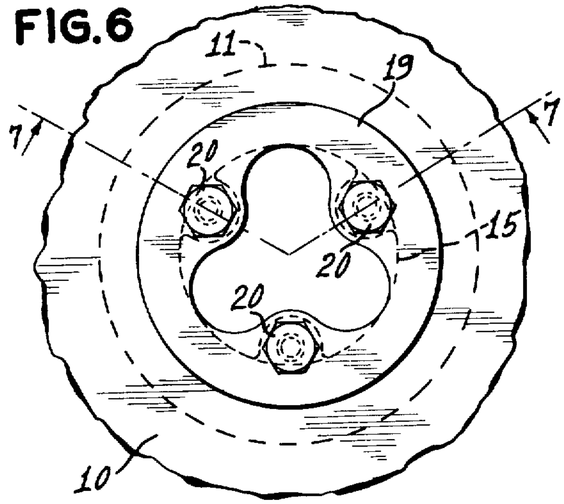
FIG. 6 is a bottom plan view showing a means of connecting a traffic signal housing to a wire entrance fixture employing the adapter member of this invention and using the combination of connecting bolts and serrated juncture to provide 360° rotational position.

In FIGS. 6–9 there are shown two methods of connecting housing 10 to fixture 11 through adapter member 12 with 360° rotational positioning therebetween. In FIGS. 6 and 7 it may be seen that serrated edge 16 is fashioned on both the top of adapter member 12 and the outlet of fixture 11 so that the two component parts will mate with each other in any of a large number of possible rotational positions. In order to fasten these two component parts to each other in a rigid selected position there is employed a combination of bolts 20 with bolt plate 19 and tapped holes 21. The internal structure of fixture 11 is made with a shoulder 28 for each bolt 20. The purpose of shoulder 28 is to provide enough mass of metal for drilling and tapping a hole 21 into which a corresponding bolt 20 may be screwed. In the embodiment shown these drawings three such shoulders 28 are employed to provide receptables for three bolts 20 to fasten the component parts together. Bolt plate 19 is large enough to extend beyond the edges of the passageway 15 through adapter member 12 and through the top of housing 10 the central portion of bolt plate 19 is cut away to provide a passageway for the wires which may be introduced from fixture 11 into the internal portions of housing 10. Bolt holes in plate 19 are aligned with tapped holes 21 in fixture 11. It will be appreciated that bolts 20 may be loosened sufficiently to permit rotation of adapter member 12 with respect to fixture 11 employing the serrated connection 16, and when a desired positioning is reached the tightening of bolts 20 will maintain that position in a rigid connection.

Figure 9:
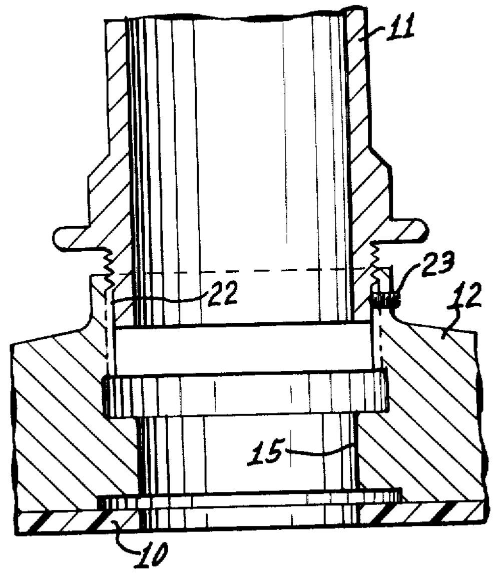
FIG. 9 is a cross sectional view taken at 9—9 of FIG. 8.
Figure 8:
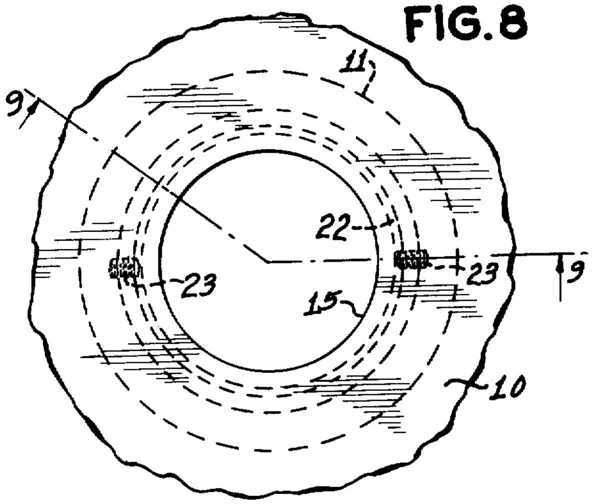
FIG. 8 is a bottom plan view of an alternative means for joining a traffic signal housing to a wire entrance fixture employing the adapter member of this invention where the connection is made with mating threaded portions and the rotational positioning is provided with set screws.

In FIGS. 8 and 9 another embodiment is shown for joining fixture 11 to the combination of adapter member 12 and housing 10. In this instance there is so serrated connection between adapter member 12 and fixture 11, but rather the connection is made by means of threads 22 preferably tapered pipe threads. The upper end of passageway 15 is provided with female threads and the outlet end of fixture 11 is provided with corresponding male threads which can be engaged with each other in the usual fashion. In order to provide the necessary rotational positioning there may be employed any of several common techniques, among which is the use of one or more set screws 23 as shown in these drawings. Another alternative procedure would be to provide a series of holes around the circumference of the connection 22 in both fixture 11 and adapter member 12 through which pins may be inserted to fix the two component parts in any rotational position desired. Still other procedures for accomplishing this same purpose will be obvious to those skilled in the art.

Figure 10:
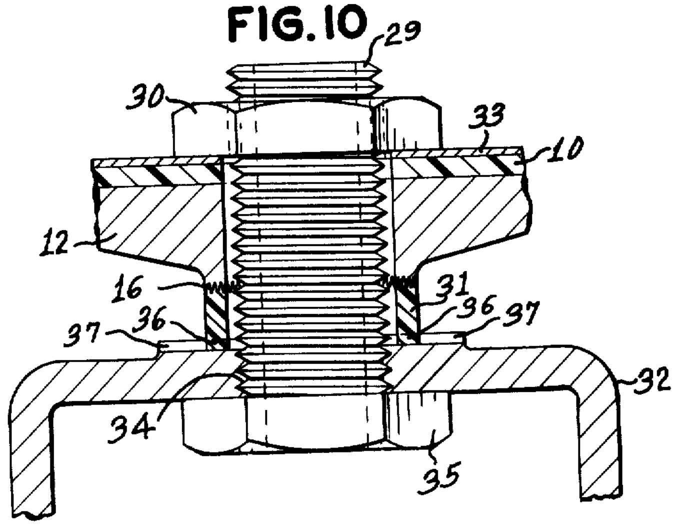
FIG. 10 is a cross sectional view of an arrangement for attaching the bottom of a traffic signal housing to an adapter member of this invention and mounting the assembly on the top of a post.

In FIG. 10 there is illustrated a method of employing the adapter member 12 of this invention to attach traffic signal housing to the top of a vertical post that might be positioned alongside a highway. Over the top of a post (not shown) is placed a hollow cap member 32 having a threaded hole 34 at the top surface. Cap member 32 may be attached to the post by screws, pins, or any other fastening means. Hollow bolt 29 is screwed into hole 34 and locked into place by bolt head 35. Annular serrated ring 31 is placed around bolt 29 with tabs 36 fitting into key ways 37 in cap 32 to prevent rotational movement of ring 31 with respect to cap 32. Adapter member 12 is screwed or bolted to the bottom surface of housing 10 in the same fashion as described above in FIG. 4 employing holes 17. This arrangement permits the assembly of adapter member 12 and housing 10 to be placed over the upward projecting portion of bolt 29 so that serrated surface 16 mates with the serrations on ring 31 and provides the means for directional orientation of housing 10 with respect to cap 32. Nut 30 is then screwed on tightly to make the entire assembly a rigid arrangement. It is usually desirable to include a metallic bearing plate 33 or a large washer which will distribute the stresses produced by nut 30 over a large area of plastic housing 10. Lead wires to the equipment in housing 10 are admitted through the internal space of bolt 29 and thus cap 32 serves as another type of wire entrance fixture. A nipple and two nuts may be used in place of bolt 29 and nut 30.

A comparison testing was undertaken of the prior art traffic signal housing assembly as shown in FIG. 1, and the assembly of this invention as shown in FIG. 2. A fixture was prepared that would rigidly mount a pair of 3-section traffic signals to suspension fixtures similar to 11 in FIGS. 1 and 2. Both assemblies had internal structures of bolt plates 19, bolt 20, tapped holes 21, and shoulders 28 as shown in FIGS. 6–7 to connect fixture 11 to housing 10. Both assemblies were rigidly attached at the top (through fixture 11) to a rigid suspension arm, and were joined to each other at the bottom of each housing 10 with a tie bar, the connection between the tie bar and the housing including a universal joint. The center of the tie bar was attached a motor driven connecting rod capable of providing reciprocating movement normal to the face of each housing. The force applied by the connecting rod was a 7.5 pound load to the base of each housing assembly. This translated to 322 in-lb. moment at the top of housing 10 where it was connected to fixture 11 (in the prior art assembly) or to adapter member 12 (in the assembly of the present invention). This was equivalent to wind force of 4.88 pounds per section of the traffic signal. The cyclic frequency of the reciprocating connecting rod was 76/min. Measurements showed that under these forces the bottom of the prior art assembly exhibited a displacement movement 2.75 times greater than that of the invention assembly in a backward direction and 2.25 times greater than that of the invention assembly in a forward direction. These results indicated a great improvement in stiffness imparted to the assembly by use of the adapter member of this invention.

The reciprocating force was applied until each assembly failed by reason of the plastic housing breaking. The following tabulation shows the results of several tests, some of which employed plastic housings of yellow color and others of black color.

| | | Cycles to Failure | |
|---|---|---|---|
| Test No. | Color | Prior Art Assy. | Invention Assy |
| 1 | yellow | 45,000 | |
| 2 | black | 109,000 | |
| 3 | yellow | 45,000 | |
| 4 | yellow | 19,700 | |
| 5 | yellow | 26,000 | |
| 6 | black | 100,000 | |
| 7 | yellow | | 1,500,000 |
| 8 | yellow | | 2,100,000 |
| 9 | yellow | | 1,660,000 |
| 10 | black | | 2,350,000 |
| 11 | yellow | | 1,730,000 |

When these data are averaged the following results are calculated:

| | Average Cycles to Failure | |
|---|---|---|
| Color | Prior Art Assy | Invention Assy. |
| yellow | 33,900 | 1,750,000 |
| black | 104,500 | 2,350,000 |

The assembly of this invention is therefore shown to provide approximately 50 times longer life than that of the prior art assembly in the yellow color and approximately 22 times longer life in the black color. It is not known why there is better performance with black color although it may be that the black pigment formulation employed to mold the plastic housing contains or does not contain a substances which condition provides an improved resistance to fatigue failure.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. An adapter member for connection to the top surface or bottom surface of a molded plastic traffic signal housing and adapted to be connected to the outlet of a metallic wire entrance fixture, said adapter member comprising a rigid body having a top, a bottom, and a passageway through said body from said top to said bottom, said body adjacent said passageway at said top being shaped to mate with the outlet end of the wire entrance fixture so as to provide 360° rotational positioning of said body with respect to said fixture, said bottom of said body being shaped and adapted to be substantially coextensive with, to substantially correspond to, and to be fastened to the major portion of said top surface or bottom surface of said molded plastic traffic signal housing.

2. The adapter member of claim 1 which is made of a cast metal, or suitably selected molded or cast plastic material.

3. The adapter member of claim 1 in which said body has an internal honeycomb structure.

4. The adapter member of claim 1 wherein said body adjacent said passageway at said top includes a circular shoulder serrated to mate with a corresponding serrated shoulder on the outlet of said metallic wire entrance fixture.

5. The adapter member of claim 1 further comprising bolt means for securing said member to said traffic signal housing.

6. The adapter member of claim 5 further comprising a bolt plate within said housing and having spaced holes therethrough, said wire entrance fixture having spaced tapped holes aligned with said bolt plate holes, said bolt means including a plurality of spaced bolts having heads which engage said bolt plate and threaded shanks which engage said tapped holes in said wire entrance fixture.

7. The adapter member of claim 1 wherein said bottom of said adapter member is planar, said adapter member including a plurality of spaced tapped holes aligned with holes in said housing and a plurality of screws respectively engaging said holes in said adapter member and securing said traffic signal housing thereto.

8. The adapter member of claim 1 wherein said top end of said body adjacent said passageway is a female portion to receive therein a corresponding male portion at said outlet end of said wire entrance suspension fixture.

9. The adapter member of claim 8 wherein said male and female portions are threaded.

10. The adapter member of claim 9 further comprising set screw means passing through said female portion and engaging said male portion to affix said adapter member in a selected angularity with respect to said wire entrance fixture.

11. An apparatus for joining the top or bottom planar surface of a molded plastic traffic signal housing to the outlet of a tubular metallic wire entrance fixture having a wire passageway therethrough, comprising a rigid metallic body having a vertical passageway therethrough in general alignment with said wire passageway, said body having a generally frustoconical continuous outer surface extending from adjacent the upper end of said passageway which mates with said outlet of said tubular fixture to the bottom of said body which mates with and is generally coextensive with said top or bottom planar surface of said housing, said body including spaced dished out portions forming a generally honeycomb internal structure as viewed from the bottom thereof, said internal structure having reinforcing webs between said frusto-conical surface and extending to a bottom planar surface of said body in contact with said top or bottom planar surface of said housing to distribute fatigue forces more evenly throughout said top or bottom planar surfaces.

12. The apparatus of claim 11 in which said body is a cast metal, or a suitably selected molded or cast plastic material.

13. The apparatus of claim 11 wherein said body includes a portion surrounding said passageway adjacent the top thereof, said portion being serrated, to mate with a correspondingly serrated portion of said wire entrance fixture.

14. The apparatus of claim 11 in which said body includes a plurality of holes extending upwardly from the bottom planar surface thereof, means extending into said holes for attaching said body to said traffic signal housing.

15. The apparatus of claim 11 in which said passageway adjacent the top thereof contains threads and the outlet of said wire entrance suspension fixture contains corresponding threads to mate therewith.

16. The apparatus of claim 11 further comprising releasable fixing means connected between said suspension fixture and said body to permit 360° adjustment therebetween about the longitudinal axis of said passageway.

* * * * *